United States Patent Office 3,231,635
Patented Jan. 25, 1966

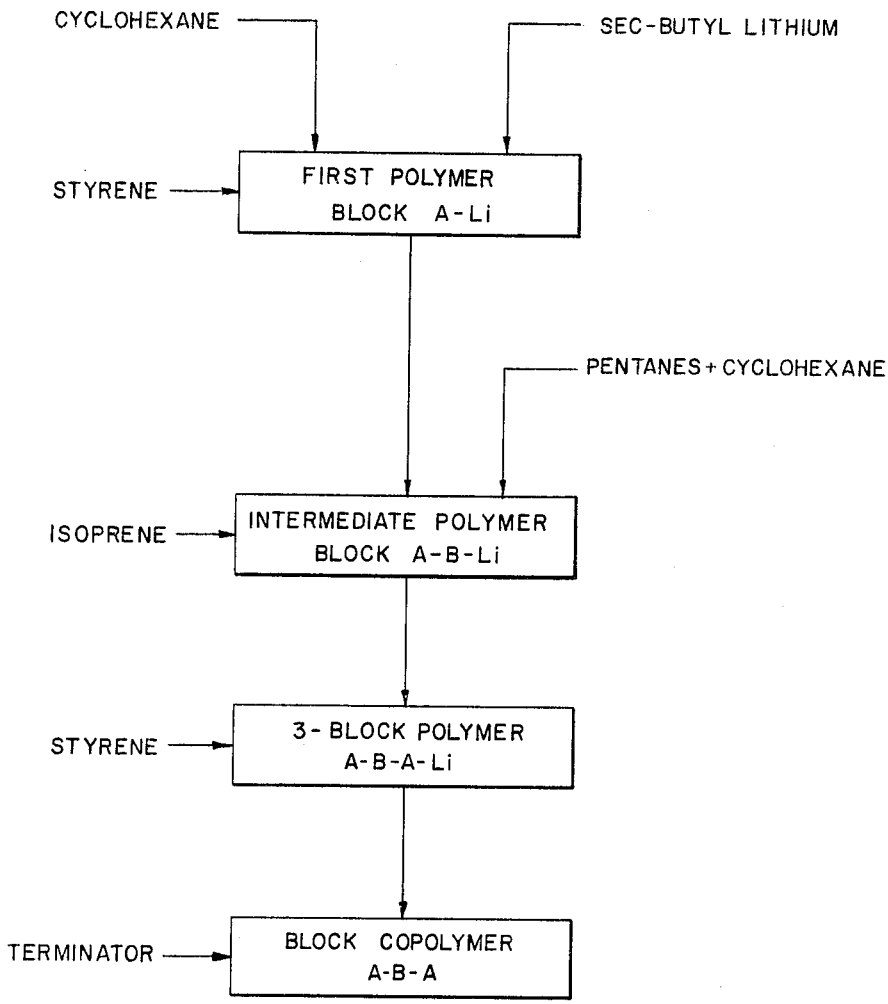

3,231,635
PROCESS FOR THE PREPARATION OF
BLOCK COPOLYMERS
Geoffrey Holden, Anaheim, Calif., and Ralph Milkovich, Stow, Ohio, assignors to Shell Oil Company, New York, N.Y., a corporation of Delaware
Filed Oct. 7, 1963, Ser. No. 314,198
7 Claims. (Cl. 260—880)

This is a continuation-in-part of U.S. Patent application Serial No. 169,674, filed January 29, 1962.

This invention relates to a method for the block copolymerization of certain monomers.

According to prior art processes, a number of catalysts have been employed for the preparation of block polymers and also for the preparation of polystyrene capable of forming block polymers. In the latter case, it is known to utilize normal alkyl lithium catalysts for the preparation of polystyrene capable of forming block polymers. No reference is made in the disclosure of this latter process to the use of alkyl lithium catalysts other than normal alkyl lithium. However, experience has shown that this catalyst is inherently slow in initiating polymerization. This slow initiation results in a number of disadvantages such as lack of control over segmental molecular weights and molecular weight distributions. Distributions are broad rather than narrow as desired. Also, since normal alkyl lithium catalysts can initiate polymerization more or less throughout the process (due to gradual activation of the catalyst), two-segment block polymers of variable molecular weights and composition and homopolymers of variable molecular weight result.

The prior art also describes the preparation of certain block copolymers from the homopolymers being considered here. However, where block copolymers comprising two blocks, e.g., polystyrene-polyisoprene, are formed, only normal alkyl lithium catalysts have been shown to be effective. Wherever the block copolymers comprise three polymer blocks, dilithium initiators such as dilithium stilbene were utilized. This results in a process reequiring the initial formation of a polymer block which will eventually be the center block of the copolymer, after which a second monomer is injected from which the two terminal plastic blocks are formed. It is necessary with these dilithium initiators to operate in the presence of certain polar compounds, such as tetrahydrofuran, resulting in a relatively low cis 1,4-content and high 3,4-content of any diene polymer block present in the product. This in turn, results in marked disadvantages relative to the performance properties of the product and its compositions with other elastomers.

The preparation of block copolymers is fully described in our parent application Serial No. 169,674, filed January 29, 1962. The process broadly comprises the block copolymerization of two types of monomers, one of them being capable of forming polymer blocks having the typical properties of elastomers and the other being capable of forming polymer blocks having typical properties of thermoplastics. Two such copolymerizable monomers, for example, are isoprene and styrene, respectively. When block copolymerized within the correct ratio to one another, a wide variety of products may be obtained. It is necessary, however, to closely regulate the molecular weights of the individual blocks and the ratio of the thermoplastic blocks to elastomeric blocks in order to optimize physical properties for any given utility.

By way of illustration, reference will be made primarily to block copolymers having three principal blocks, the two terminal polymer blocks being thermoplastic with an interior center block having elastomeric properties. This may be illustrated as polystyrene-polyisoprene-polystyrene. As the proportion of polystyrene is increased relative to polyisoprene in such a block copolymer, the properties of the copolymer become more and more nearly that of a thermoplastic material. Moreover, if the block copolymer is contaminated with homopolymers such as polystyrene or polyisoprene, the unique properties of the block copolymer are correspondingly degraded. Furthermore, if the molecular weight of each of the individual blocks is not closely controlled, properties of the products obtained will vary within a relatively wide range.

It is an object of this invention to provide an improved process for block copolymerizing conjugated dienes with alkenyl-substituted aromatic hydrocarbons. It is a particular object of the invention to provide a process for preparing improved block polymers of this variety. It is a particular object of the invention to provide improved block copolymers having enhanced properties as components for blending with other elastomeric materials. Other objects of this invention will become apparent during the following detailed description of the invention. Now, in accordance with the present invention an improved process is provided comprising a sequential process for the production of a block copolymer, wherein the catalyst employed for this purpose comprises an alkyl lithium catalyst having at least two alkyl substituents on the carbon atom to which the lithium is directly attached. In its broadest aspects, the process comprises the utilization of such a catalyst for the sequential block copolymerization of alkenyl-substituted aromatic hydrocarbons with conjugated dienes, the polymerized product having at least 3 polymer blocks.

The two classes of products considered may be represented as A-B-A and B-A-B where A and B respectively are polymer blocks of the alkenyl substituted aromatic hydrocarbon and conjugated dienes respectively. The invention will be primarily described relative to the former type of block copolymer wherein the two terminal polymer blocks comprise, for example, polystyrene and the center polymer block is that of a conjugated diene.

It has been unexpectedly found that the use of secondary or tertiary alkyl lithium catalysts results in a number of unexpected and unpredictable advantages not experienced when utilizing normal alkyl lithium catalysts for the formation of similar block copolymers: The induction period is reduced to an insignificant figure so that the block molecular weight is closely controlled. The undesired initiation of polymerization which results in the formation of two segment blocks and homopolymers of variable molecular weight in the product is eliminated. The block copolymer products have substantially improved physical properties and the compositions of the block polymer products with elastomers have properties not experienced with block copolymers made with normal alkyl lithium catalysts.

In addition to permitting polymerization of three-segment block polymers free of homopolymer and two-segment blocks, closer control of the distribution of molecular weights of polystyrene end segments is important. If the end segments are too short, they contribute little to network strength; while if they are longer than necessary, the additional polystyrene impairs elastomeric qualities.

The figure illustrates a typical example of the preparation of the block copolymers prepared by the process of the present invention. According to the figure, the first polymer block comprising polystyrene terminated with lithium is formed in a zone by introduction of styrene, cyclohexane (as solvent) and secondary butyl lithium into the polymerization zone. After formation of the first polymer block, the second stage in the process wherein the elastomeric polymer block is formed is effected by introduction of isoprene into the reaction mixture, preferably together with further solvent including a refluxing phase for temperature control. This results in the formation of an intermediate block copolymer comprising a first block of polystyrene and a second block of polyisoprene terminated with lithium. In the third stage of the process, an alkenyl-substituted aromatic hydrocarbon (such as more styrene) is added to the reaction mixture and polymerization continued to form the three block polymers A-B-A, still terminated with lithium which is removed in the final stage of the process by the addition of a chain terminator such as an alcohol or the like.

The catalysts to be used in the process of the present invention comprise alkyl lithium compounds which may be either secondary or tertiary alkyls. These will have the general configuration

wherein each R is an alkyl radical and R' is hydrogen or alkyl. They include particularly secondary butyl lithium, tertiary butyl lithium, secondary amyl lithium, tertiary amyl lithium, secondary hexyl lithium, tertiary hexyl lithium and other alkyl lithium compounds preferably having from 4 to 8 carbon atoms per molecule.

The proportion of initiator taking an active part in the block copolymerization will be varied between about 100 and about 2000 parts per million based on the weight of the total monomers used.

Polymerization will be conducted at temperatures in the order of minus 20 to about 100° C., preferably at temperatures between about 20 and 65° C., the temperature being controlled to yield the polymer product within a reasonable length of time at the initiator level being utilized.

The alkenyl aromatic hydrocarbons are preferably one or more monovinyl substituted aromatic hydrocarbons such as styrene, alpha methyl styrene, vinyl toluene, vinyl xylene, vinyl naphthylene, etc. The conjugated diene hydrocarbons with which these are block copolymerized preferably have from 4 to 8 carbon atoms per molecule and constitute one or more of the series butadiene, isoprene, pentadiene-1,3,2-dimethylbutadiene and the like.

The conditions of polymerization are adjusted so as to produce a first polymeric block having an average molecular weight between about 2000 and 100,000. Having formed this first polymer block, the next stage in the process comprises addition of the second type of monomer, in this illustrative instance being a conjugated diene such as one of those enumerated above. The proportion of monomer, assuming substantially complete polymerization thereof, will be sufficient to form a polymer block having an average molecular weight between about 25,000 and 1 million. Since, under the conditions of the process, the first polymer block is a "living polymer chain" terminated with a lithium radical, the block polymerization proceeds at the end of each of these living chains to form an intermediate two-block polymer having the structure A-B-Li. After completion of the second polymer block, the terminal polymer block will be formed by introduction of the same or a different alkenyl-substituted aromatic hydrocarbon such as styrene. Again, this block copolymerizes with the living polymer chains and results under the conditions employed in the formation of a living three-block polymer having the general configuration A-B-A-Li. The lithium is deactivated and the polymerization terminated by the injection at this point of a suitable chain terminator such as an alcohol, $H_2O$ or other known agents for this purpose.

The desirability for close control over the molecular weight of each of the individual blocks is emphasized by the several major utilities desired for these products. The block polymers per se are strikingly useful as "self-vulcanizing" elastomers when the correct relationship exists between the proportions of the elastomeric to non-elastomeric blocks and the individual molecular weights thereof. If the molecular weights of the plastic (non-elastomeric) blocks such as the polystyrene blocks are unduly high, or present in too high a proportion relative to the elastomeric blocks, the copolymer exhibits relatively poor elastomeric properties although it may be useful for other purposes such as adhesives or high impact resistant replacements for the usual thermoplastics such as polystyrene, polyethylene and the like.

Another reason for maintaining close control over the individual block lengths is that there is a relatively critical relationship betwene the block lengths and the effectiveness of the block copolymer in modifying other elastomers, such as polymers of conjugated dienes. In the latter instance, the principal objective is to improve the green strength and processability characteristics of conjugated diene polymers. This objective is not realized to a maximum if the correct block lengths are not obtained. Furthermore, even if the average molecular weight of the individual block is within a target area, it has been found that this is not fully satisfactory if the average is merely that of a relatively wide spread in molecular weights. On the contrary, it is highly desirable to achieve essentially monodisperse polymer segments in which the molecular weights of the individual blocks are within a relatively narrow range. These objectives are obtained by the use of secondary (or tertiary) alkyl lithium initiators and are not obtained by the use of normal alkyl lithium initiators. The data given in the working examples hereinafter will substantiate these statements.

Block copolymerization is preferably conducted in the presence of solvents. These must be chosen with some care for two principal aspects: If a borderline solvent system is utilized, in which the block copolymer at any stage in its preparation becomes somewhat insoluble, the danger exists that chain growth will be slow and non-uniform from monomer being rendered inaccessible to the growing chains at that point, resulting in broad molecular weight distributions both for the block in question and for the next block to form thereon. Precipitation of a polymer at any stage may be due either to insolubility of the particular species at that time in the solvent present but may be strongly affected by the temperature utilized for the polymerization procedure. Solvents may be selected for a secondary purpose, namely, the control of temperature during polymerization by reflux. Consequently, the temperature and solvent chosen for the process both have powerful effects on the ultimate properties of the polymerization product.

When the block copolymer being formed is one in which the two terminal blocks are alkenylarene polymers such as polystyrene blocks, it is preferable to employ a cyclic hydrocarbon, which may be either a cycloaliphatic such as cyclohexane or a member of the benzene series such as benzene or toluene. The former type namely, cycloaliphatic hydrocarbon, is preferred since such materials are more easily purified. It is realized that mere traces of certain impurities such as acetylenic impurities may have powerful deleterious effects upon the continuance of polymerization in the presence of the extremely small proportions of catalyst required.

It is often desirable to utilize mixed solvent systems, one solvent being present initially for the formation of the first polymer block and a second solvent or mixture of solvents being injected separately or together with the introduction of the second monomer species. As a typical example, the initial polystyrene block may be kept in solution (and thereby minimize the danger of unintended termination) by initial polymerization in the presence of cyclohexane. At this stage, it is possible to operate the system under adiabatic conditions as long as a relatively low initial temperature is utilized, this being in the order of 20–45° C. If temperatures higher than this, such as 60–80° C., are employed for the formation of this first block, the polymerization is so rapid that there is danger of premature termination. Consequently, it would be difficult to achieve close control over molecular weights and quality of product if these latter high temperatures were employed.

When the second monomer for the formation of the middle polymer block (such as isoprene or butadiene) is injected, the need for close temperature control increases. Moreover the requirement for a miscible solvent is modified as the proportion of polymerized diolefin increases. This may be achieved by the injection together with or separately from the conjugated diene monomer of an aliphatic hydrocarbon such as an olefine or an alkane boiling within a suitable range such that the refluxing solvent may be employed for temperature control. Typically, $C_5$ hydrocarbons (pentenes or pentanes) may be employed for this purpose, since they boil within the desired temperature range for close process control.

The specific solvent or solvent mixture may be varied dependent upon the temperature range desired and upon the pressure present in the system. Consequently, aliphatic hydrocarbons having from 4–7 carbon atoms per molecule are most suitable for this purpose and are preferably present during the formation of the conjugated diene polymer block in an amount between about 25 and 75% of the total solvent present, in the system. Following completion of the desired second (eventually middle) polymer block, an alkenyl arene is then introduced to continue polymerization forming the second terminal block. The solvent system may or may not be modified still further at this time.

Typical products of this process are illustrated by the following:

Polystyrene-polyisoprene-polystyrene
Polystyrene-polybutadiene-polystyrene
Polystyrene-polyisoprene-poly(alpha-methylstyrene)

Hydrogenated derivatives of the block copolymers formed by the process of this invention may be formed if desired. These are chiefly useful because of their enhanced stability and increased service temperatures. Hydrogenation may be either partial or complete and conditions and catalysts may be chosen so as to hydrogenate one portion of the molecule while minimizing hydrogenation of another portion. For example, the hydrogenation of the conjugated diene polymer blocks is often more effective for improving resistance to oxidation than if the plastic blocks such as polystyrene blocks are hydrogenated while not modifying the elastomeric blocks.

While the present invention is primarily directed to the use of secondary (or tertiary) alkyl lithium compounds in the sequential formation of block polymers, other methods may be employed for the formation thereof, such as by means of coupling reactions. In the latter instance, the procedure involves the formation of the first polymer block such as polystyrene, forming a second polymer block of the second type such as polyisoprene, the second block being allowed to polymerize only to about half of the molecular weight eventually desired. Following this, coupling agents such as dihalogen hydrocarbons or divinyl arenes are then utilized for coupling the living polymers to form block copolymers having the desired A-B-A configuration. It will be seen that the same considerations are involved here relative to the desirability of employing secondary (or tertiary) alkyl lithium catalysts as are present in the use of the claimed sequential type of process.

The molecular weights of the individual blocks may be varied as stated hereinbefore dependent upon the intended end use. For many purposes, such as use of the block copolymers as self-curing elastomers, or for modification of conjugated diene elasctomers, it is highly preferred to employ block polymers having the structure A-B-A wherein each A is an independently selected polymer block of a vinyl aromatic hydrocarbon, the average molecular weight of each A being between about 10,000 and 45,000; B is a polymer block of a conjugated diene, the average molecular weight of the block being between about 35,000 and 150,000, the weight of the A blocks being less than about 38% by weight of the total copolymer.

The block copolymers may be modified with polymer extending oils particularly those which are compatible with the elastomeric segment, or with pigments or polystyrene, any of which may be present in amounts between about 0 and 100 parts by weight per 100 parts of the block copolymer. The presence of these may enable a change in one or more of the block copolymer molecular weight aspects. For example, where Y is a number between the parts by weight of block copolymer (100) and the sum of the parts by weight of block copolymer + a compatible polymer extending oil, the average molecular weight of the conjugated diene center block may be expressed by the figure $Y(350-1{,}500)$.

In the modification of conjugated dienes with block copolymers prepared according to the process of this invention, it is desirable to utilize the block polymer in an amount between about 5 and 50% by weight of the total modified composition in order to improve the green strength and/or processability of the conjugated diene elastomer. Elastomers which may be so modified include, for example, polyisoprene and polybutadiene.

The advantages of the present invention are extended to another aspect only briefly referred to hereinbefore: This has to do with elimination of impurities from the reaction mixture prior to polymerization. One suitable means of eliminating these impurities is by cautious incremental additions of catalyst to the mixture until such time as polymerization is initiated. At this point, it is regarded that the impurities have been neutralized or otherwise inactivated and that polymerization will continue under full control from this point on.

This period between injection of an incremental proportion of initiator and the start of polymerization is referred to for convenience as the "induction period." However, the induction period is difficult to determine with a high degree of precision, especially if the initiator involved is relatively slow in causing an initiation such as is true with normal alkyl lithium compounds. For example, with normal butyl lithium and a reaction temperature in the order of 32° C., the induction period is usually 8–10 minutes. Therefore, consequently, when "titrating" the impurities with small catalyst increments it is necessary to wait between each increment to see if polymerization is initiated with initiators entailing the relatively long induction periods, these waiting intervals add up to a material economic disadvantage. The use of secondary (or tertiary) alkyl lithium initiators virtually eliminates these waiting intervals and enable a relatively rapid removal of impurities by these initial incremental additions of initiator.

Generally, in alkyl lithium-initiated polymerizations, each catalyst molecule is responsible for the initiation of one polymer chain. Specifically, in the secondary butyl lithium-initiated polymerization of styrene, it has been observed that the number average molecular weight can be directly computed from the pounds of polymer made divided by the moles of catalyst added. On the other hand, this is not true for polymerizations initiated with normal butyl lithium because of its slow initiation rate. In the relatively short period required for polymerization, only a part of the catalyst molecules are activated sufficiently to initiate growing polystyrene chains. The remainder of the normal butyl lithium survives the entire polymerization period without reacting. In sharp contrast, the rapid initiation and polymerization achieved with secondary butyl lithium results in all the catalyst being active by the time less than about 15% of the monomer has been converted to polymer.

The consequences of this are several fold: When using normal alkyl lithium, not only is there an uneven degree of polymerization, resulting in a broad spectrum of molecular weights but also the residual normal alkyl lithium catalyst remains in the system and causes the formation of two-segment blocks upon injection of the second monomer, namely a conjugated diene or homopolymer on injection of the third monomer. New chains are initiated throughout the course of the normal butyl lithium catalyzed styrene polymerization, whereas with secondary butyl lithium, all the chains are initiated substantially at one time. As a consequence, the molecular weight distribution of the normal butyl lithium-catalyzed polystyrene block is considerably wider. This results in a high ratio of viscosity average molecular weight to number average molecular weight.

Because of the relatively slow initiation rates with normal alkyl lithium catalysts, the time (excluding induction period) required to polymerize even 50% of the original monomer is considerably longer with normal alkyl lithium than with a secondary (or tertiary) alkyl lithium catalyst. Because of the very high molecular weight fraction generated by the first normal akyl lithium molecules to react, the polystyrene initially produced tends to be less soluble than those catalyzed by a secondary alkyl lithium.

In cases where sequential polymers are prepared, as in the present process, the precipitated polystyrene chains are relatively unreactive since they have limited access to new monomer. Hence, unless special precautions are taken, such as by use of a better solvent system than can otherwise be employed, the problem of block polymer purity is compounded in sequentially produced block copolymers when normal alkyl lithium catalyst is employed, but is virtually absent when branched chain alkyl initiators are utilized.

The following comparative examples illustrate the advantages of utilizing secondary alkyl lithium catalyst in the preparation of sequential polymers having three polymer blocks. The consequences of the specific catalyst type are not evident in forming homopolymeric polystyrene, nor even in the formation of block copolymers where only two polymer blocks are involved. The latter type of block copolymer is not one having the self vulcanizing feature characteristic of the three-block copolymers described hereinbefore, nor do they effectively improve the green strength of diene elastomers.

EXAMPLE I

Utilizing the same process conditions, two block polymers products were formed having the principal structure, polystyrene-polyisoprene-polystyrene Sample "A" was prepared by the use of secondary butyl lithium catalysts and sample "B" for comparison was prepared by the use of normal butyl lithium catalysts. The first polymer block was formed by polymerization of styrene in cyclohexane at 32° C., utilizing 5530 p.p.m. of the catalyst based on styrene. An induction period of zero minutes was experienced with secondary butyl lithium and of 10 minutes with normal butyl lithium catalyst. Table I gives details of the molecular weights obtained under the conditions employed at each stage in the process. Following the formation of the first polystyrene block, isoprene was injected into the system together with isopentane (70/30, cyclohexane/isopentane) and polymerization continued at 55–57° C. Finally, styrene was introduced after all of the isoprene had been consumed and polymerization continued to form the third polymer block.

Table I

CONSTITUTION OF POLYMERS PREPARED UNDER SIMILAR CONDITIONS EXCEPT FOR CATALYST TYPE

|  | A Sec-Butyl Lithium | | B N-Butyl Lithium | |
| --- | --- | --- | --- | --- |
|  | $M_n$ | $M_v$ | $M_n$ | $M_v$ |
| First Block (styrene) | 12 | 12 | 35 | 49 |
| Second Block (isoprene) | 152 | 155 | 165 | 166 |
| Third Block (styrene) | 15 |  | 18 |  |

$M_n$ = number average molecular weight.
$M_v$ = viscosity average molecular weight.

It will be noted from the above table that the number average and viscosity average molecular weight of the block copolymer first block are substantially identical when secondary butyl lithium was employed, but that there is a difference of roughly 50% between these values in the first block of the polymer prepared with normal butyl lithium.

This effect is carried over into the properties of the block polymers per se which are given in Table II, which follows:

Table II

EFFECT OF BLOCK POLYMER CATALYST TYPE ON NEAT POLYMER PROPERTIES

|  | Sec-Butyl Lithium | N-Butyl Lithium |
| --- | --- | --- |
| Mill Behavior | Good | Poor |
| Tensile, $T_B$ (p.s.i.) | 3,600 | 780 |
| 300% Modulus (p.s.i.) | 130 | 60 |
| Hardness | 42 | 30 |

According to the above table, it will be seen that there is a striking improvement in all properties in the polymer prepared by the use of secondary butyl lithium as compared with that derived from the use of normal butyl lithium.

These properties are carried over still further into the compositions prepared by incorporation of the block copolymers with a high cis polyisoprene, the proportion of block copolymer being 30% of block polymer and 70% of polyisoprene. They were also tested for their stress-strain properties. Table III summarizes the results obtained.

Table III

EFEFCT OF BLOCK POLYMER CATALYST TYPE ON IMPROVED ISOPRENE RUBBER

|  | Sec-Butyl Lithium | N-Buytl Lithium |
| --- | --- | --- |
| Green Strength: | Good | Fair |
| Yield (p.s.i.) | 22 | 24 |
| Elongation, $E_B$ (percent) | 680 | 775 |
| Tensile, $T_B$ (p.s.i.) | 49 | 16 |
| Self reinforcement | Yes | No |

It will be seen by the above table that the block polymer prepared by the use of secondary butyl lithium results in substantially improved results with the rubber blend.

We claim as our invention:

1. A block copolymerization process comprising the steps:
   (a) polymerizing a mono alkenyl-substituted aromatic hydrocarbon in the presence of a catalytic proportion between about 100 and 2000 parts by weight per million parts by weight of total monomers of a $C_{4-8}$ alkyl lithium catalyst wherein the carbon atom directly attached to lithium bears at least two alkyl substituents, whereby a polymer block A-Li is formed, wherein A is a homopolymerized aromatic hydrocarbon;

(b) injecting a conjugated diene into the polymerization zone and continuing polymerization whereby an intermediate block polymer A-B-Li is formed, wherein B is a homopolymerized diene block;
(c) injecting a mono alkenyl aromatic hydrocarbon into the polymerization zone and continuing polymerization, whereby block polymer A-B-A-Li is formed,
(d) adding a chain terminator, and
(e) recovering the block copolymer having the structure A-B-A wherein each A has an average molecular weight between about 10,000 and 45,000 and B has an average molecular weight between about 35,000 and 150,000, the total weight of the A blocks being less than about 38% of the total copolymer.

2. A block copolymerization process according to claim 1 wherein the lithium catalyst is a secondary alkyl lithium.

3. A block copolymerization process according to claim 1 wherein the alkenyl-substituted aromatic hydrocarbon is a mono vinyl arene.

4. A block copolymerization process according to claim 1 wherein the diene is a $C_{4-6}$ diene.

5. A block copolymerization process according to claim 1 wherein the aromatic hydrocarbon is styrene.

6. A block copolymerization process according to claim 1 wherein the diene is isoprene.

7. A block copolymerization process according to claim 1 wherein the diene is butadiene.

References Cited by the Examiner
UNITED STATES PATENTS

| | | | |
|---|---|---|---|
| 3,030,346 | 4/1962 | Cooper | 260—880 |
| 3,078,254 | 2/1963 | Zelinski et al. | 260—880 |
| 3,149,182 | 9/1964 | Porter | 260—880 |

MURRAY TILLMAN, *Primary Examiner.*